United States Patent [19]
Chacko et al.

[11] Patent Number: 4,677,150
[45] Date of Patent: Jun. 30, 1987

[54] MODIFIED POLYESTER COMPOSITIONS

[75] Inventors: Varkki P. Chacko, Summit; Paul DeStio, Bound Brook; Gerald A. Baum, Paramus, all of N.J.

[73] Assignee: Celanese Engineering Resins Inc., Chatham, N.J.

[21] Appl. No.: 816,483

[22] Filed: Jan. 10, 1986

[51] Int. Cl.$^4$ ............................................. C08L 69/00
[52] U.S. Cl. ................................. 524/449; 524/451; 524/504; 525/67; 525/148; 525/902
[58] Field of Search ................ 525/67, 146, 902, 148; 524/449, 451, 504

[56] References Cited

U.S. PATENT DOCUMENTS 4,482,672 11/1984 Neuray et al. .................. 525/67
4,554,314 11/1985 Chung et al. .................... 525/67

FOREIGN PATENT DOCUMENTS 0135779 4/1985 European Pat. Off.

Primary Examiner—Theodore E. Pertilla
Attorney, Agent, or Firm—Joshua J. Ward

[57] ABSTRACT

Poly($C_2$–$C_4$ alkylene terephthalate) molding composition containing aromatic polyester carbonate and impact modifier. The aromatic polyester carbonate is derived from a dihydric phenol, a carbonate precursor and dicarboxylic acid or ester forming derivative thereof. The impact modifier may be a core-shell polymer polymerized from monomers comprising butadiene or may be a core-shell polymer having a first elastomeric phase polymerized from a monomer system including $C_1$–$C_6$ alkylacrylate as well as crosslinking and graftlinking monomers and having a final rigid thermoplastic phase polymerized in the presence of the elastomeric phase.

14 Claims, No Drawings

MODIFIED POLYESTER COMPOSITIONS

BACKGROUND OF THE INVENTION

The invention relates to improvements in thermoplastic polyesters and especially to polyester compositions including poly($C_2$–$C_4$ alkylene terephthalate) such as polybutylene terephthalate (PBT).

PBT or other poly($C_2$–$C_4$ alkylene terephthalates) have been widely used in molding compositions including molding compositions which also contain impact modifiers and aromatic polycarbonates. U.S. Pat. Nos. 3,864,428, 4,257,937, 4,180,494 and 4,280,948 for instance teach the use of such polyester resins in molding compositions which also include aromatic polycarbonate of the type described in U.S. Pat. No. 4,034,016 together with core-shell type impact modifiers. Polyester molding compositions including PBT, aromatic polycarbonate and aromatic polyester carbonate are also known and are described for instance in U.S. Pat. No. 4,226,961. While these various prior art formulations are satisfactory for many purposes they have mechanical and thermal properties which are not completely satisfactory for some applications.

SUMMARY OF THE INVENTION

It is accordingly an object of the invention to provide an improved polyester molding composition. As compared with known prior art compositions the compositions of the invention have improved mechanical and thermal properties, including improved heat distortion temperatures and high temperature strengths and improved impact strengths, especially at low temperatures.

Improved polyester molding composition of the invention consists essentially of:

(a) between about 10 wt. % and about 90 wt. % poly($C_2$–$C_4$ alkylene terephthalate) with at least about 50 wt. % of such poly($C_2$–$C_4$ alkylene terephthalate) being polybutylene terephthalate having an intrinsic viscosity between about 0.5 and about 2.0 dl/g;

(b) between about 8 wt. % and about 50 wt. % based on (a), (b) and (c) of aromatic polyester carbonate derived from dihydric phenol, carbonate precursor, and aromatic dicarboxylic acid or ester forming derivative thereof; and (c) between about 10 wt. % and about 40 wt. % based on (a), (b) and (c) of impact modifier selected from the group consisting of:

(1) core-shell polymer comprising about 25 to about 95 wt. % of a first elastomeric phase polymerized from a monomer system comprising about 75 to 99.8% by weight $C_1$ to $C_6$ alkyl acrylate, 0.1 to 5% by weight crosslinking monomer, and 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and about 75 to 5 wt. % of a final, rigid thermoplastic phase polymerized in the presence of said elastomeric phase; and (2) a butadiene based core-shell polymer formed between a butadiene polymer where butadiene units account for at least 50 mole % of the total polymer and at least one vinyl monomer In a preferred embodiment of the invention, PBT comprises at least about 50 wt. % of (a), (b) and (c).

Preferred aromatic polyester carbonates are those having the general formula:

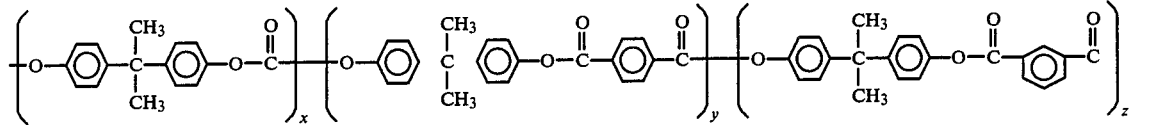

(Formula I)

Preferred butadiene based core-shell polymers are of the MBS type having a butadiene based rubbery core, a second stage polymerized from styrene and an acrylate final stage.

DETAILED DESCRIPTION OF THE INVENTION

As noted above, compositions of the invention include polybutylene terephthalate (PBT), aromatic polyester carbonate and core-shell type impact modifier.

PBT used in the invention may be produced in any suitable manner such as by reacting terephthalic acid or a dialkyl ester of terephthalic acid, e.g., dimethyl terephthalate, with diols having four carbon atoms, e.g., tetramethylene glycol. PBT for use in the invention has an intrinsic viscosity (I.V.) between about 0.5 and about 2.0 dl/g measured in orthochlorophenol at 25° C., with material having an I.V. between about 0.5 and about 1.3 dl/g being preferred. Manufacture of PBT is well known to those skilled in the art as are the techniques for obtaining PBT of desired intrinsic viscosity. Such conventional production techniques for PBT are discussed in greater detail, for instance, in U.S. Pat. No. 2,465,319.

In addition to PBT, compositions of the invention may include other poly($C_2$–$C_4$ alkylene terephthalates) such as polyethylene terephthalate (PET) and polypropylene terephthalate (PPT). These, like the PBT, may be produced by any suitable conventional methods.

Aromatic polyester carbonates suitable for use in compositions of the invention include those described in U.S. Pat. No. 3,169,121, the disclosure of which is incorporated herein by reference. In general, such polyester carbonates are derived from a dihydric phenol such as 2,2,bis(4-hydroxyphenol)propane, which is also well known as bisphenol A, a carbonate precursor such as phosgene and an aromatic dicarboxylic acid such as terephthalic or isophthalic acids or ester forming derivatives thereof.

Preferred aromatic polyester carbonates suitable for use in the invention include those having the general formula

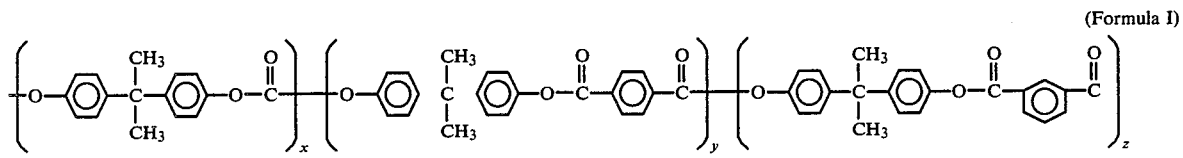

(Formula I)

wherein x, y and z are integers, the ratio of x to y to z is in the range of about 10–80 x to about 1–60 y to about 10–90 z and the melt flow rate (MFR) of the polyester carbonate is between about 0.2 and about 10 as measured in accordance with ASTM D-1238, condition 0, with melt flow rates between about 0.5 and about 5 being especially preferred. Polyester carbonate of this preferred structure can also contain up to about 2 wt. % of chain stopping (end capping) monomers.

Polyester carbonates suitable for use in the invention are available from a number of sources including General Electric Company (Lexan PPC 4701 or PPC 4501) and Dow Chemical Company (XP-73036.00 or XU-73405.00).

Aromatic polyester carbonate of the invention is present in compositions of the invention in amounts of between about 8 and about 50 wt. % more preferably between about 8 and about 20 wt. % based on the total of poly($C_2$–$C_4$ alkylene terephthalate), polyester carbonate and core-shell type impact modifier.

Impact modifiers suitable for use in compositions of the invention are of the multiphase type commonly known as core-shell polymer and may be either core-shell polymer polymerized from monomers comprising butadiene (butadiene type) or core-shell polymer of the type described in U.S. Pat No. 4,096,202, the disclosure of which is incorporated herein by reference (acrylate type). Such acrylate type polymer comprises from about 25 to about 95 wt. % of a first elastomeric phase and about 75 to 5 wt. % of a final rigid thermoplastic phase. One or more intermediate phases are optional and preferable, for example, a middle stage polymerized from about 75 to 100 percent by weight styrene. The first stage is polymerized from about 75 to 99.8 wt. % $C_1$ to $C_6$ acrylate resulting in an acrylic rubber core having a glass transition temperature below about 10° C. and crosslinked with 0.1 to 5 percent crosslinking monomer and further containing 0.1 to 5 percent by weight graftlinking monomer. The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate. The graftlinking monomer is a polyethylenically unsaturated monomer having a plurality of adition polymerizable reactive groups, at least one of which polymerizing at a substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomer particles. A preferred final stage monomer system is at least about 50 wt. % $C_1$ to $C_4$ alkyl methacrylate.

Acrylate type core-shell polymer suitable for use in compositions of the invention is available from Rohm and Haas Company under the tradename Paraloid KM-330.

Butadiene-type core-shell polymers suitable for use in compositions of the invention are described for instance in U.S. Pat. No. 4,180,494, the disclosure of which is incorporated herein by reference. Such butadiene based core-shell polymers preferably involve a graft copolymer formed between a butadiene polymer core whose butadiene units account for at least 50 mole % of the total polymer and at least one vinyl monomer such as a derivative of acrylic or methacrylic acid. In preferred embodiments more than one vinyl monomer is grafted to the butadiene rubber; for example a preferred copolymer is a three-stage polymer having a butadiene based rubbery core, a second-stage polymerized from styrene and a final stage or shell polymerized from methylmethacrylate and 1,3-butylene glycol dimethacrylate.

Butadiene type core-shell modifiers suitable for use in compositions of the invention are available for instance from Rohm and Haas Company under the tradename Paraloid KM-653 and from M & T Chemicals under the designation Metablen C-223.

Impact modifiers are used in compositions of the invention in amounts between about 10 and about 40 wt. % based on the total of poly($C_2$–$C_4$ alkylene terephthalate), polyester carbonate and core-shell type impact modifier and more preferably in amounts between about 10 and about 25 wt. % on the same basis.

If desired, compositions of the invention may include thermally stable reinforcing fibers or fillers conventionally used in the production of PBT molding compositions. Glass fibers treated with silane or other coupling agent are preferred reinforcing fibers. Such reinforcing fibers will normally be used in amounts between about 3 and about 50 wt. % based on total molding composition and may be incorporated into the molding composition in any suitable manner such as by separate extrusion blending with the previously formed composition or incorporating into the composition during injection molding of products from the composition of the invention. Suitable reinforcing fillers include for instance mica, wollastonite, clay and talc. Combinations of fiber and filler may also be used. The combination of glass fiber and mica filler is especially useful. Calcium carbonate is also a preferred filler.

Molding compositions of the invention may also contain suitable flame retardant additives in amounts up to about 25 wt. % based on the total of poly($C_2$–$C_4$ alkylene terephthalate), polyester carbonate and core-shell type impact modifier and may contain relatively minor amounts of other material which do not unduly effect the desired characteristics of the finished product. Such additional materials may, depending upon the particular compositions employed and product desired, include for instance nucleating agents, stabilizers, colorants, mold release agents, blowing agents etc. Where present such additional materials normally comprise no more than about 20 wt. % of the total composition.

In especially preferred embodiments, compositions of the invention include up to about 40 wt. %, preferably between about 10 wt. % and about 35 wt. %, based on the total of poly(C$_2$–C$_4$ alkylene terephthalate), polyester carbonate and impact modifier of flame retardant which is either (i) a low molecular weight polymer of a carbonate of a halogenated dihydric phenol, said polymer containing from 2 to 10 repeating units of the formula

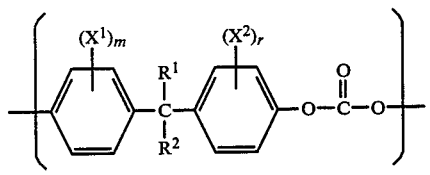

wherein R$^1$ and R$^2$ are hydrogen, (lower) alkyl, or phenyl, X$_1$ and X$_2$ are bromo and m and r are from 1 to 4, said lower molecular weight polymer (i) being terminated with halogenated aromatic substituents of the formulae:

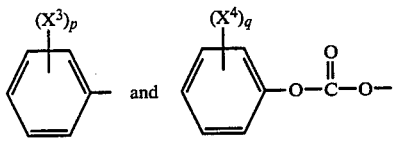

wherein X$^3$ and X$^4$ are bromo and p and q are each from 1 to 5, when heated above about 200° C., and a softening point of less than about 300° C. or (ii) a combination of said polymer (i) and an inorganic or organic antimony-containing compound such as antimony oxide or oxychloride, phosphate, antimony caproate, etc. Especially preferred flame retardants of this type are described in greater detail in U.S. Pat. No. 3,855,277 the disclosure of which is incorporated herein by reference. In a particularly preferred flame retardant the low molecular weight polymer has the formula (Formula II)

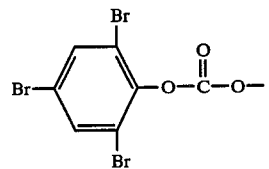

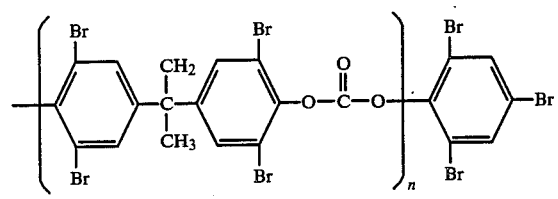

The use of this type of flame retardant results in a substantial and unexpected improvement in elongation characteristics of compositions of the invention.

The following examples are intended to illustrate various emobidments of the invention without limiting the scope of the invention. As used herein, the following terms have the meanings given below.

| Term | Description |
|---|---|
| PBT | polybutylene terephthalate having an intrinsic viscosity of 1.1–1.3 decileters per gram (dl/g) as measured in orthochlorophenol at 25° C. |
| PET | polyethylene terephthalate having an intrinsic viscosity of 0.5–0.9 dl/g as measured in orthochlorophenol at 25° C. |
| Polyester carbonate A | polyester carbonate available from Dow Chemical Company under the trade designation XU 73405.00 and believed to consist essentially of material of Formula I in which the ratio of x to y to z is 46 to 42 to 12 and the melt flow rate (MFR) is 0.6 |
| Polyester carbonate B | polyester carbonate available from Dow Chemical Company under the trade designation XP 73036.00 and believed to consist essentially of material of Formula I in which the ratio of x to y to z is 82 to 14 to 5 and the MFR is 2.2 |
| Polyester carbonate C | polyester carbonate available from General Electric Company under the tradename Lexan PPC 4701 and believed to consist essentially of material of Formula I in which the ratio of x to y to z is 25 to 6 to 70 and the MFR is 0.9 |
| Polyester carbonate D | polyester carbonate available from General Electric Company under the tradename Lexan PPC 4501 and believed to consist essentially of material of Formula I in which the ratio of x to y to z is 57 to 3 to 40 and the MFR is 2.1 |
| Polycarbonate | bis-phenol A polycarbonate having an MFR of 10.9 and available from General Electric Company under the tradename LEXAN 141 |
| MBS I | methacrylate-butadiene-styrene core-shell impact modifier available from Rohm & Haas Company under the tradename KM 653 |
| MBS II | methacrylate-butadiene-styrene core-shell impact modifier available from M & T Chemicals under the tradename Metablen C-223 |
| BA-MMA | butylacrylate methylmethacrylate core-shell impact modifier available from Rohm & Haas Company under the tradename KM 330 |
| FR I | brominated polycarbonate of Formula II available from Great Lakes Chemical Company under the tradename BC 58 |
| FR II | ultra-fine antimony oxide powder available from Laurel Industries |
| FR III | brominated epoxy flame retardant available from M & T Chemicals under the tradename Thermoguard 240 |

The molding compositions referred to in the following examples were prepared by first drying all ingredients as necessary and then extruding the blend of ingredients on a Harting single screw extruder or a Werner and Pfleiderer twin screw extruder. The resulted extruder blends were dried thoroughly and ASTM test specimens were molded on a 4 ounce Van Dorn injection molding machine. Extrusion temperatures of about 250° C. were maintained for the single screw (SS) extrusions with temperature of about 290° C. being maintained when the twin screw (TS) extruder was used. Molding conditions included melt temperatures of 510°–530° F. and mold temperatures of about 100°–120° F.

EXAMPLES 1-27

These examples show impact strengths of a variety of molding compositions. The ingredients of the various compositions are given in weight percent and presented in Table I below along with the results of the impact tests. The impact tests were notched Izod tests carried out in accordance with ASTM D-256 at room temperature (RT) for all compositions and at temperatures of −20° C. and −40° C. for some compositions. All compositions reported in Table I were prepared by single screw extrusion except for the compositions of Examples 24 and 25 which were prepared by twin screw extrusion.

carbonate is needed to achieve the benefits of the invention. Examples 25-27 are provided to show the results of comparable testing on molding compositions using polycarbonate rather than the polyester carbonate required by the invention.

It is seen that polyester carbonate based compositions exhibit superior impact strength compared to polycarbonate based compositions at room temperature as well as at low temperatures.

EXAMPLES 28-36

These examples show the results of testing of a number of molding compositions containing flame retardant of the type preferred for use in compositions of the invention. Flex modulus, flex strength, tensile strength and ultimate elongation tests on compositions of Examples 29-31 were in accordance with ASTM with the results of these tests also being reported in Table II. Compositions tested and results obtained are reported in Table II.

TABLE I

| Example No. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Composition (wt %) | | | | | | | | | | | | | | | | | |
| PBT | 90 | 85 | 80 | 90 | 80 | 69.2 | 85 | 80 | 75 | 80 | 75 | 70 | 69.2 | 60 | 60 | 60 | 60 |
| Polyester Carbonate A | | | | | | | 5 | 10 | 15 | 5 | 10 | 15 | 15 | | 20 | | 20 |
| Polyester Carbonate B | | | | | | | | | | | | | | | | 20 | |
| Polyester Carbonate C | | | | 10 | 20 | 15 | | | | | | | | | | | |
| Polyester Carbonate D | | | | | | | | | | | | | | 20 | | | |
| Polycarbonate | | | | | | | | | | | | | | | | | |
| MBS I | 10 | 15 | 20 | | | 15 | 10 | 10 | 10 | 15 | 15 | 15 | 15 | | | | 20 |
| MBS II | | | | | | | | | | | | | | | | | |
| BA-MMA | | | | | | | | | | | | | | 20 | 20 | 20 | |
| Antioxidant | | | | | | 0.8 | | | | | | | 0.8 | | | | |
| Lubricant | | | | | | | | | | | | | | | | | |
| Results | | | | | | | | | | | | | | | | | |
| Notched Izod (ft lb/in) | | | | | | | | | | | | | | | | | |
| Room temp. | 2.7 | 18.2 | 19.5 | 0.96 | 1.05 | 23.7 | 2.6 | 16.8 | 21.2 | 18.3 | 20.5 | 24.2 | 24.3 | 25.5 | 26.7 | 25.2 | 23.3 |
| −20° C. | | | | | | | | | | | | | | | | | 17.6 |
| −40° C. | | | | | | | | | | | | | | | | | 1.5 |

| Example No. | 18 | 19 | 20 | 21 | 22 | 23 | 24 | 25 | 26 | 27 |
|---|---|---|---|---|---|---|---|---|---|---|
| Composition (wt %) | | | | | | | | | | |
| PBT | 60 | 60 | 60 | 60 | 60 | 55.3 | 60 | 60 | 60 | 70 |
| Polyester Carbonate A | 20 | | | | | | | | | |
| Polyester Carbonate B | | 20 | 20 | | | | | | | |
| Polyester Carbonate C | | | | | | 10 | | | | |
| Polyester Carbonate D | | | | 20 | 20 | | 20 | | | |
| Polycarbonate | | | | | | 5 | | 20 | 20 | 15 |
| MBS I | | 20 | | 20 | | 15 | 20 | 20 | | 15 |
| MBS II | 20 | | 20 | | 20 | | | | | |
| BA-MMA | | | | | | | | | 20 | |
| Antioxidant | | | | | | 1.3 | | | | |
| Lubricant | | | | | | 0.4 | | | | |
| Results | | | | | | | | | | |
| Notched Izod (ft lb/in) | | | | | | | | | | |
| Room temp. | 20.5 | 25.2 | 19.0 | 24.0 | 19.6 | 24.9 | 23.4 | 20.9 | 23.5 | 21.5 |
| −20° C. | 9.3 | 2.4 | 22.6 | | 18.3 | | 24.6 | 21.9 | | |
| −40° C. | 11.3 | 1.3 | 6.8 | | 6.5 | | 23.8 | 4.0 | | |

From the results presented in Table I above it can be seen that molding compositions in accordance with the invention (Examples 6-24) produced test specimens showing improved impact characteristics as compared to compositions 1-5 which contain only PBT and impact modifier or PBT and polyester carbonate although it does appear that a minimum of about 8% polyester

TABLE II

| Example No. | 28 | 29 | 30 | 31 | 32 | 33 | 34 | 35 |
|---|---|---|---|---|---|---|---|---|
| Ingredients | | | | | | | | |
| PBT | 48.1 | 48 | 40 | 45 | 40 | 40 | 40 | 45 |
| PET | | | | | | | 10 | |
| Polyester Carbonate A | | | | | | | | |
| Polyester Carbonate B | | | | | | | | |
| Polyester Carbonate C | | | | | 20 | | 10 | 20 |
| Polyester Carbonate D | | | | | | 24.5 | | |
| Polycarbonate | | | 24.5 | | 24.5 | | | |
| MBS I | | | | | | | | |
| MBS II | | | | | | 15 | 15 | 20 |
| BA-MMA | 25 | 25 | 15 | 15 | | | | 15 |
| FR-I | 20 | 20 | 13 | 13 | 13 | 13 | | 13 |

TABLE II-continued

| Example No. | 28 | 29 | 30 | 31 | 32 | 33 | 34 | 35 |
|---|---|---|---|---|---|---|---|---|
| FR-II | 4.5 | 4.5 | 5.0 | 5.0 | 5.0 | 5.0 | 6.0 | 5.0 |
| FR-III | | | | | | | 14 | |
| Lubricant | 2.4 | 2.5 | 2.5 | 2.0 | 2.5 | 2.5 | 2.5 | 2.0 |
| Extruder type | SS | TS | TS | TS | SS | SS | SS | SS |
| Results | | | | | | | | |
| Notched Izod (ft lb/in) | | | | | | | | |
| Room temp. | 2.4 | 2.2 | 11.5 | 19.0 | 13.6 | 15.6 | 14.5 | 12.4 |
| Flex Modulus (psi) | | 207,000 | 306,000 | 270,000 | | | | |
| Flex Strength (psi) | | 5080 | 10,900 | 9920 | | | | |
| Tensile Strength (psi) | | 4970 | 7300 | 6800 | | | | |
| Ultimate Elongation (%) | | 20 | 5 | 85 | | | | |

From the results shown in Table II it can be seen that Examples 31 and 33–36 which were formulated in accordance with the invention exhibited superior impact strength with respect to the compositions of Examples 28 and 29 which had neither polyester carbonate nor polycarbonate and Example 30 and 32 which had polycarbonate but not polyester carbonate. Thus, the composition of Example 31 had a significantly higher impact strength than the composition of Example 30, the composition of Example 33 had higher impact strength than the composition of Example 32. Examples 29–31 also demonstrate the extreme improvement in ultimate elongation for compositions of the invention using the preferred flame retardant additives.

The composition of Examples 28–35 were also tested for flammability and all achieved a rating of V-O when tested according to the UL 94 flammability test at 1/16 inch thickness.

While the invention has been described above with respect to preferred embodiments thereof, it will be understood by those skilled in the art that various changes and modifications may be made without departing from the spirit or scope of the invention.

What is claimed is:

1. Polyester molding composition consisting essentially of:
   (a) between about 55 weight percent and about 82 weight percent poly($C_2$–$C_4$ alkylene terephthalate) with at least about 50 weight percent of such poly($C_2$–$C_4$ (PBT)alkylene terephthalate) being polybutylene terephthalate (PBT) having an instrinsic viscosity between about 0.5 and about 2.0 dl/g;
   (b) between about 8 weight percent and about 20 weight percent based on (a), (b) and (c) of aromatic polyester carbonate derived from dihydric phenol, carbonate precursor, and aromatic dicarboxylic acid or ester forming derivative thereof; and
   (c) between about 10 weight percent and about 25 weight percent based on (a), (b) and (c) of impact modifier selected from the group consisting of:
   (1) core-shell polymer comprising about 25 to about 95 weight percent of a first elastomeric phase polymerized from a monomer system comprising about 75 to 99.8 percent by weight $C_1$ to $C_6$ alkyl acrylate, 0.1 to 5 percent by weight crosslinking monomer, and 0.1 to 5 percent by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and about 75 to 5 weight percent of a final, rigid thermoplastic phase polymerized in the presence of said elastomeric phase; and
   (2) butadiene based core-shell polymer formed between a butadiene polymer where butadiene units accound for at least 50 mole percent of the total polymer and at least one vinyl monomer.

2. Molding composition according to claim 1 wherein PBT comprises at least about 50 wt. % based on components (a), (b) and (c).

3. Molding composition according to claim 1 which includes up to about 40 wt. % based on components (a), (b) and (c) of flame retardant which is either:
   (i) a low molecular weight polymer of a carbonate of a halogenated dihydric phenol, said polymer containing from 2 to 10 repeating units of the formula

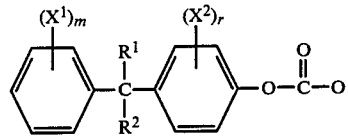

wherein $R^1$ and $R^2$ are hydrogen, (lower) alkyl, or phenyl, $X^1$ and $X^2$ are bromo and m and r are from 1 to 4, said lower molecular weight polymer (i) being terminated with halogenated aromatic substituents of the formulae:

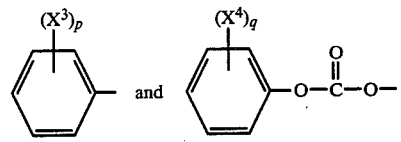

wherein $X^3$ and $X^4$ are bromo and p and q are each from 1 to 5, when heated above about 200° C., and a softening point of less than about 300° C.; or
   (ii) a combination of said polymer (i) and an inorganic or organic antimony-containing compound.

4. Molding composition according to claim 3 in which the flame retardant is present in amounts between about 10 wt. % and about 35 wt. % based on components (a), (b) and (c).

5. Molding composition according to claim 4 in which the flame retardant is of the formula (Formula II)

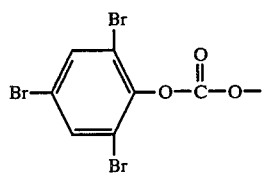

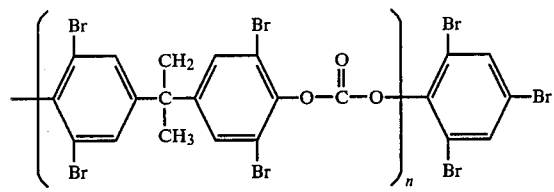

6. Molding composition according to claim 1 wherein the aromatic copolyester carbonate has the formula (Formula I)

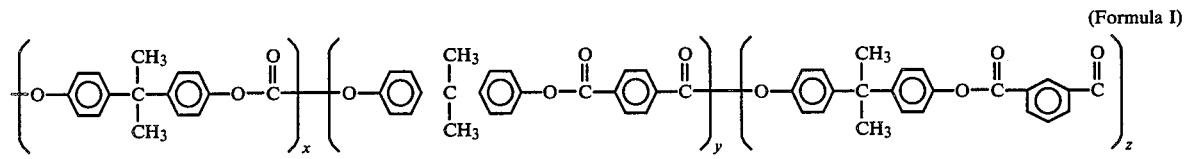

wherein x, y and z are integers, the ratio of x to y to z is in the range of about 10–80 x to about 1–60 y to about 10–90 z and the melt flow rate of the polyester carbonate is between about 0.2 and about 10 as measured in accordance with ASTM D-1238, condition 0.

7. Molding composition according to claim 1 wherein the impact modifier comprises core-shell polymer comprising about 25 to about 95 wt. % of a first elastomeric phase polymerized from a monomer system comprising about 75 to 99.8% by weight $C_1$ to $C_6$ alkyl acrylate, 0.1 to 5% by weight crosslinking monomer, and 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and about 75 to 5 wt. % of a final, rigid thermoplastic phase polymerized in the presence of said elastomeric phase.

8. Molding composition according to claim 7 wherein the impact modifier is a three stage polymer having a first elastomeric phase core polymerized from $C_1$ to $C_6$ acrylate, a second stage polymerized from styrene and a third rigid stage polymerized from monomer at least about 50 wt. % of which is $C_1$ to $C_4$ alkyl methacrylate.

9. Molding composition according to claim 1 wherein the impact modifier comprises a butadiene based core-shell polymer formed between a butadiene polymer where butadiene units account for at least 50 mole % of the total polymer and at least one vinyl monomer.

10. Molding composition according to claim 9 wherein the impact modifier is a three stage polymer having a butadiene based rubbery core, a second stage polymerized from styrene and a final stage polymerized from methylmethacrylate and 1,3-butylene glycol dimethacrylate.

11. Molding composition according to claim 1 which includes between about 3 and about 50 wt. % thermally stable reinforcing fibers or filler or mixture thereof.

12. Molding composition according to claim 11 in which the thermally stable reinforcing fibers are glass fibers.

13. Molding composition according to claim 11 in which the reinforcing fibers or filler is a mixture of glass fibers and mica filler.

14. Molding composition according to claim 11 in which the reinforcing fiber or filler is talc.

* * * * *